United States Patent [19]

Faulkner et al.

[11] 3,780,270

[45] Dec. 18, 1973

[54] BAR/HALF-BAR OPTICAL CODE READER

[75] Inventors: Hubert D. Faulkner, Irving; Stanley D. Requa, Dallas, both of Tex.

[73] Assignee: Recognition Equipment Incorporated, Irving, Tex.

[22] Filed: June 20, 1972

[21] Appl. No.: 264,608

[52] U.S. Cl. 235/61.11 E, 340/146.3 Z, 250/219 D

[51] Int. Cl. .............................................. G06r 7/10

[58] Field of Search .............. 235/61.11 E, 61.11 F; 340/146.3 H, 146.3 Z, 146.3 AG; 250/219 D, 340/219 DC

[56] References Cited

UNITED STATES PATENTS

| | | | |
|---|---|---|---|
| 3,225,175 | 12/1965 | Hyypolainen | 235/61.11 E |
| 3,562,494 | 2/1971 | Schmidt | 235/61.11 E |
| 3,676,644 | 7/1972 | Vaccaro et al. | 340/146.3 Z |

*Primary Examiner*—Thomas A. Robinson

*Attorney*—D. Carl Richards et al.

[57] ABSTRACT

A moving image of a series of vertical bars and half-bars is projected onto a columnar array of photosensitive elements. Signals from each element are amplified and compared with a threshhold value to produce light or dark output signals for each element. The output signals are decoded by logic gates which include a first group of four input NAND gates and a second group of two input NAND gates. Each one of the first group of NAND gates has each of its four inputs connected from four adjacent photosensitive element outputs while each one of the second group of NAND gates has each of its two inputs connected from two adjacent photosensitive element outputs. An output signal from one or more of said first group of NAND gates is indicative of a full bar while an output from one or more of said second group of NAND gates is indicative of a character present and a half-bar if none of the gates of the first group are operated.

15 Claims, 3 Drawing Figures

BAR/HALF-BAR OPTICAL CODE READER

The invention relates to bar/half-bar readers, and more particularly, to a bar/half-bar reader which employs a columnar array of photosensitive elements and digital feature recognition logic.

In sorting and handling documents in accordance with indicia printed thereon, it is considerably faster and less expensive to sort those documents in accordance with bar codes thereon rather than optical characters. In one application, optical characters on a document are read and then a series of bar codes are printed on the document by a system, such as that shown in the co-pending application entitled System for Document Coding and Identification, Ser. No. 129,164, filed Mar. 29, 1971 in the name of Herman L. Philipson, Jr. and assigned to the Assignee of the present application. Alternatively, bar codes may be imprinted on a document at the same time the optical characters are printed thereon.

Bar codes have particular applicability to documents which require repeated sorting, such as sales slips for credit card operations and mail pieces. For example, mail may be sorted a plurality of different times during the course of its routing and distribution. It is inordinately expensive to provide a complete optical character recognition device for each sort. If bar codes are employed, however, mail may be sorted by relatively inexpensive, high-speed bar code readers with the same degree of efficiency and accuracy as by an expensive optical character recognition machine.

In the past bar codes have been read by techniques such as analog filtering. In such systems, a document having bar codes thereon is passed by a photocell sensor array at a preselected rate to produce alternating analog current outputs of a certain frequency. The output from each cell is filtered and the filtered signals summed to produce full bar and half-bar indications. For example if only two photocells, located properly in the bar code field to be read, are employed in such a system, an alternating signal from one sensor indicates both character presence and a half-bar signal present while a signal from both sensors simultaneously indicates the presence of a full bar. The analog filtering technique possesses many disadvantages, such as the hardware requirement of a filter for each photocell in the system and the inherent inaccuracies of an analog recognition technique.

The present invention overcomes many of the disadvantages of prior art bar code readers and provides an inexpensive recognition system which employs digital feature recognition logic.

SUMMARY OF THE INVENTION

The present invention is directed to a system in which a columnar array of photosensitive elements has projected thereon a moving pattern of bar codes. The outputs of the elements are processed by digital decoder logic to produce full bar and half-bar indications. More particularly, in accordance with the invention, a bar code reader produces output signals indicative of a pattern of full bars and half-bars disposed upon a document transported through the reader. The bar code reader includes a columnar array of photosensitive elements and means for projecting an image of the bar code pattern to be read onto the columnar array. Means responsive to a signal from a first preselected number of the photosensitive elements generates a half-bar output signal while means responsive to a signal from a second preselected number greater than said first number, of the photosensitive elements generates a full bar output signal.

BRIEF DESCRIPTION OF THE DRAWING

For a more complete understanding of the present invention and for further objects and advantages thereof, reference may now be had to the following description taken in conjunction with the accompanying drawing in which.

DETAILED DESCRIPTION

Figure 1:
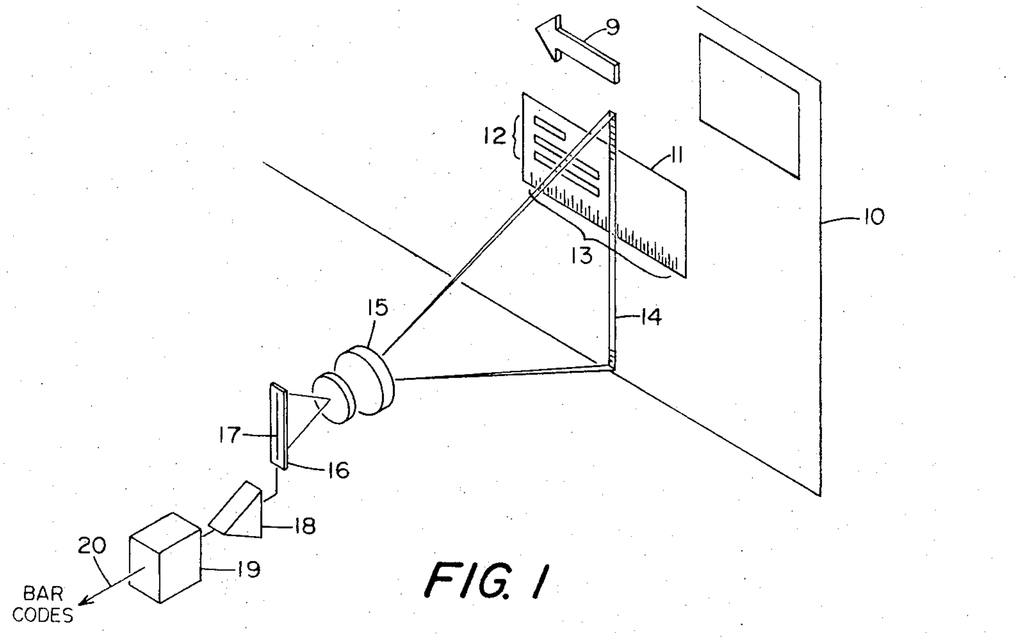
FIG. 1 is a perspective view of a bar code reader constructed in accordance with the invention.

Referring to FIG. 1, there is shown a document, such as an envelope 10 on which is located an address label 11. In the upper portion of the address label, area 12, is the printed address of the addressee while on the lower portion of the label 11, in area 13, is a bar/half-bar coded representation of all or a portion of the same address. It is an object of the present invention to read the bar coded address in area 13 and produce an output indicative of the sequence of bars and half-bars to sorting and processing circuitry (not shown).

The envelope 11 is transported in the direction of arrow 9 at a high velocity, for example at a speed on the order of 200 in./sec.

An image of a vertical columnar area 14 is projected through a lens system 15 onto a photosensitive element array 16. The array 16 comprises a column of photosensitive elements 17. Output signals from each element in the array 17 are passed through individual amplifiers and threshhold comparators, represented collectively at 18. There is one amplifier and threshhold comparator for each photosensitive element in the columnar array 17. The outputs of the amplifiers and threshhold comparators 18 are connected to digital recognition logic 19, the output of which, on line 20, is a digital representation of the bar codes in area 13 of the envelope 10.

Figure 2:
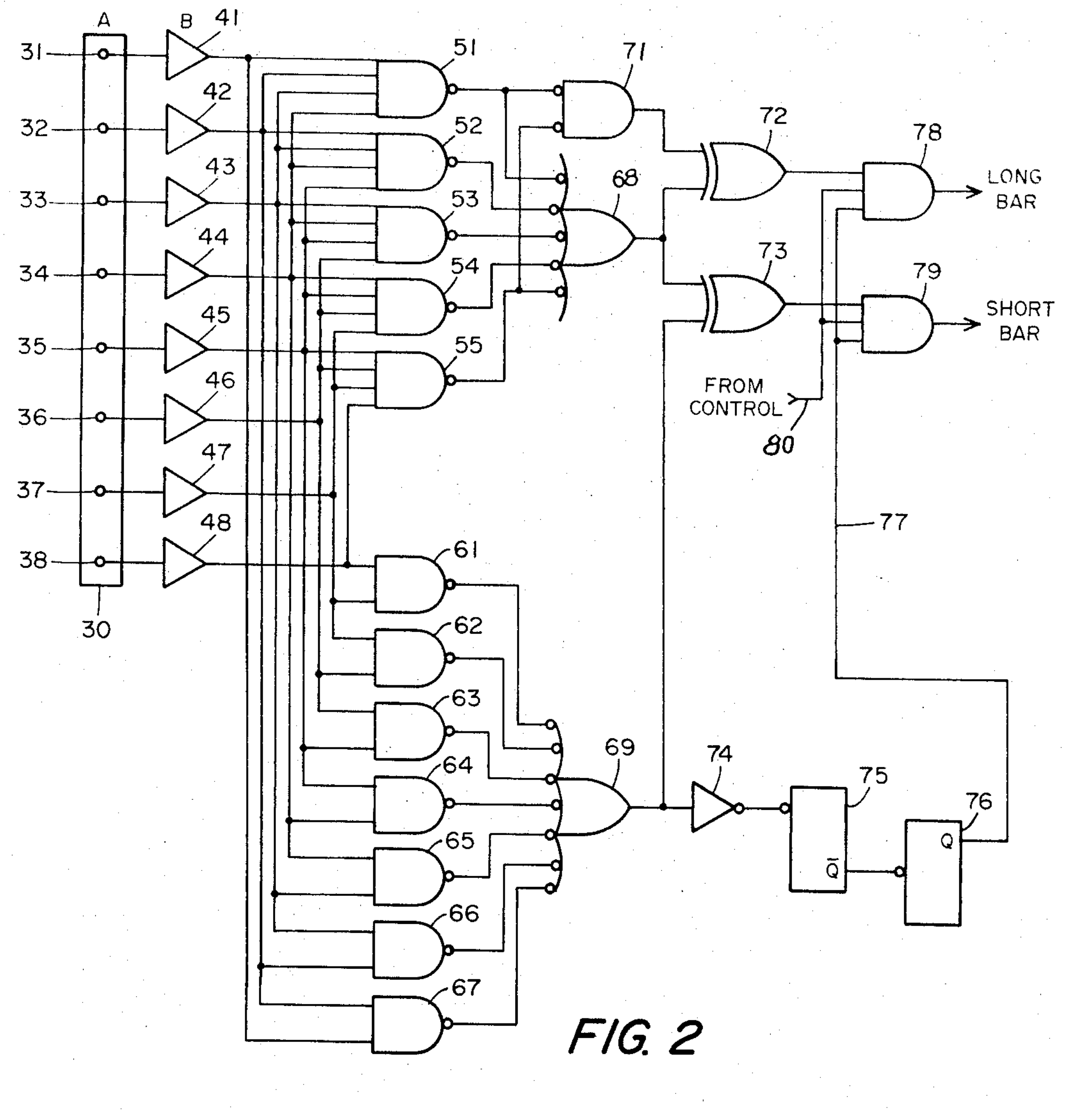
FIG. 2 is a logic diagram of a bar code reader constructed in accordance with the invention employing a discrete phototransistor array.

Referring now to FIG. 2, there is shown a columnar photosensitive element array 30 including a plurality of phototransistors 31–38. In one embodiment eight phototransistors were used of a type such as the TIL 601 phototransistor manufactured by Texas Instruments, Inc., of Dallas, Texas. The output of each of the phototransistors 31–38 are connected, respectively, to the inputs of a plurality of analog amplifier and threshhold comparators units 41–48. Each one of the units 41–48 includes an analog amplifier which amplifies the photocurrent signal produced by phototransistors 31–38 and then compares the amplified value to a preselected threshhold value. If the amplified output signal is greater than the threshhold value a "low" intermediate signal is produced indicating that the image projected onto that particular photocell is light. If the amplified current value is less than the threshhold value, then a "high" intermediate signal is produced indicating that the image projected upon that particular photocell is dark.

The circuitry of FIG. 2 also includes a first group of four input NAND gates 51–55 and a second group of two input NAND gates 61–67. Each one of the NAND gates 51–55 have their inputs connected from four adjacent ones of the amplifier and threshhold units 41–48. That is, the outputs of units 41–44 are connected to the inputs of NAND gate 51, the outputs of units 42–45 are connected to the inputs of NAND gate 52, the outputs of units 43–46 are connected to the inputs of NAND gate 53, the outputs of units 44–47 are connected to the inputs of NAND gate 54 and the outputs of units 45–48 are connected to the inputs of NAND gate 55. Each one of the second group of two input NAND gates 61–67 are connected from the outputs of two adjacent ones of the units 41–48. For example, the outputs of units 47 and 48 are connected to the inputs of NAND gate 61, the outputs of units 44 and 45 are connected to the inputs of NAND gate 64 and the outputs of units 41 and 42 are connected to the inputs of NAND gate 67.

The outputs of each of the first group of NAND gates 51–55 are connected to the inputs of a NOR gate 68 while the outputs of the second group of NAND gates 61–67 are connected to the inputs of a NOR gate 69. The outputs of NAND gates 51 and 55 are connected to the inputs of a long bar inhibit NAND gate 71. The outputs of NAND gate 71 and NOR gate 68 are connected respectively to the two inputs of a first EXCLUSIVE OR gate 72. The outputs of NOR gate 68 and NOR gate 69 are connected respectively to the two inputs of a second EXCLUSIVE OR gate 73. The output of NOR gate 69 is also connected through an amplifier 74 to a pair of series connected one-shot multivibrators 75 and 76. The output of multivibrator 76 produces a character presence signal on line 77 which is connected to one input each of a pair of full bar and half-bar output NAND gates 78 and 79. The other input of the full bar output NAND gate 78 is connected from the output of the EXCLUSIVE OR gate 72 while the other input of the half-bar output NAND gate 79 is connected to the output of the EXCLUSIVE OR gate 73. Additionally, a read window select signal from the computer control circuitry is provided over lead 80 as a third enable input to both of the output NAND gates 78 and 79.

The purpose of the multivibrators 75 and 76 is primarily to provide a dwell period in the character presence signal so that bar orientations which are skewed with respect to the array 30 can still be read.

The basic principle of operation of the decoding logic of FIG. 2 is that a dark area covering at least a first preselected number of adjacent ones of the phototransistor 31–38 is to be interpreted as a half-bar while a dark area covering at least a second preselected number of adjacent ones of the phototransistors 31–38 is interpreted as a full bar. In the present embodiment, 2–3 dark cells is considered a half-bar and 4–7 dark cells is considered a full bar. A darkened area which covers all eight of the photocells 31–38 is interpreted as a do not read condition and no output is produced.

When the photocells 31–38 are light, the outputs of the associated units 41–48 are low. When a dark area is projected onto photocells 31–38 the outputs of the associated units 41–48 go high. The outputs of the NAND gates 51–55 are normally high. Whenever all four of the inputs to one of the gates 51–55 goes high, in response to four adjacent dark photocells, the output of the particular NAND gate goes low. The output of the NOR gate 68 is normally low so that whenever one of its inputs from one of the gates 51–55 is low, the output of the NOR gate 68 goes high.

The outputs of the NAND gates 61–67 is normally high. Whenever any two adjacent ones of the phototransistors 31–38 are covered by a dark area, the associated NAND gates of the group 61–67 then produce a low output which in turn produces a high signal at the output of NOR gate 69.

The outputs of the EXCLUSIVE OR gates 72 and 73 are low as long as the two inputs are identical. Whenever the output of NOR gate 69 goes high while the output of NOR gate 68 remains low, the output of the EXCLUSIVE OR gate 73 goes high and is coupled to one of the inputs of the half-bar output NAND gate 79. Whenever the output of NOR gate 69 goes high the two multivibrators 75 and 76 are sequentially triggered to produce a high character presence signal at one input of each of the two output NAND gates 78 and 79. If a read window enable pulse is applied to lead 80 at the same time, the output gate 78 is energized to produce a high output signal indicative of a half-bar having been read.

In the event all eight of the phototransistors 31–38 are dark, each of the NAND gates 51–55 will produce low outputs. In addition to effecting a high output from NOR gate 68, the NAND gates 51 and 55 energize the long bar inhibit NAND gate 71 to produce a high output signal and inhibit the operation of the EXCLUSIVE OR gate 72. This condition is indicative of an erroneous bar reading such as a paper smudge or a document edge and inhibits the operation of full bar output NAND gate 78 so that no bar reading indication is produced.

Further modification of the circuitry of FIG. 2 includes the addition of resettable latches located at the outputs of each one of the units 41–48. The latches store a signal for a preselected time period and thereby further facilitate the reading of skewed bar arrays. The latches are reset at the end of a preselected time period so that the next bar in succession can be read.

Figure 3:
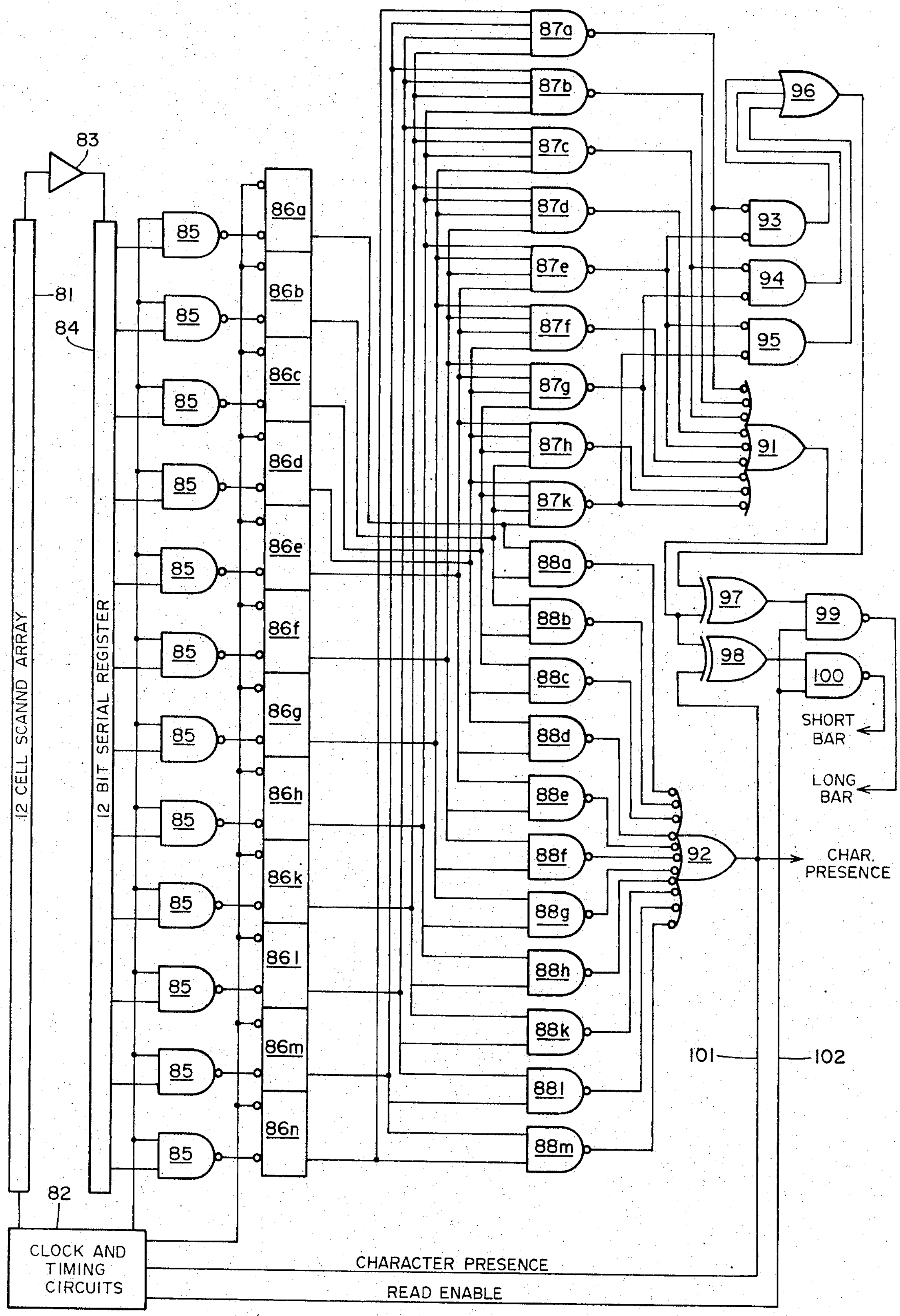
FIG. 3 is a logic diagram of a bar code reader constructed in accordance with the invention, including a self-scanned photodiode array.

Referring now to FIG. 3, there is shown a further embodiment of the invention which includes a bar/half-bar reader employing a self-scanned photodiode array 81. The photodiode array 81 may be, in one embodiment, a portion of a model RL-64 photodiode array, manufactured by Reticon Corporation of Mountain View, California. The internal construction of the array 81 consists of a column of 12 photodiodes, 12 field effect isolation transistors and a 12 bit shift register. Pulse signals from a clock and timing circuit 82 are applied to the array 81 to scan the outputs from the diodes and produce sequential signals indicative of the illumination level on each photodiode in the array 81.

The analog video output signals from the scanned array 81 are coupled through an amplifier and comparer unit 83 which amplifies the scanned video signals from the array and compares each signal with a preselected threshhold value. If a particular video signal is above the threshhold, a binary low intermediate signal is produced and if the video output level for a particular signal is below the threshhold a binary high intermediate signal is produced. The train of binary signals from the unit 83 is connected to the input of a 12 bit serial shift register 84. Each stage of the shift register 84 is connected, respectively, to one input of a group of 12 NAND gates 85. The other input of each one of the NAND gates 85 is connected from the clock timing circuit 82. The outputs of each of the NAND gates 85 are connected, respectively, to the set inputs of a group of 12 latches 86*a*–86*n*. The reset input of each of the latches 86 is connected to the clock and timing circuit 82.

The circuit of FIG. 3 also includes a first group of 9 four input NAND gates 87*a*–87*k* and a second group of 11 two input NAND gates 88*a*–88*m*. Each one of the NAND gates 87 have their inputs connected to four adjacent ones of the latches 86. For example, the outputs of latches 86*k*–86*n* are connected to the inputs of NAND gate 87*a* and the outputs of latches 86*h*–86*m* are connected to the inputs of NAND gate 87*b*. Each one of the two input NAND gates 88 have their inputs connected from the outputs of two adjacent ones of the latches 86. For example, the outputs of latches 86*m* and 86*n* are connected to NAND gate 88*m*, and latches 86L and 86*m* are connected to the inputs of NAND gate 88L.

The outputs of each of the first group of NAND gates 87*a–k* are connected to the inputs of a NOR gate 91 while the outputs of each of the second group of NAND gates 88*a–m* are connected to the inputs of a NOR gate 92. The outputs of NAND gates 87*a*, and 87*e* are connected to the inputs of a first long bar inhibit NAND gate 93, the outputs of NAND gates 87*c* and 87*g* are connected to the inputs of a second long bar inhibit NAND gate 94 and the outputs of NAND gates 87*e* and 87*k* are connected to the inputs of a third long bar inhibit NAND gate 95. The outputs of the three NAND gates 93–95 are connected to the inputs of an OR gate 96 the output of which is coupled to and input of the EXCLUSIVE OR gate 97. The output of NOR gate 92 is connected to the other input of the EXCLUSIVE OR gate 98.

The output of the EXCLUSIVE OR gate 97 is connected to one input of a full bar output NAND gate 99 while the output of EXCLUSIVE OR gate 98 is connected to one input of a half-bar output NAND gate 100. The other inputs of the two output NAND gates 99 and 100 are both connected from the clock and timing circuit 82 over a read enable lead 102. The output of the NOR gate 92 is connected to produce a character presence signal over the lead 101 to the clock and timing circuit 82.

The basic principle of operation of the decoding logic of FIG. 3 is similar to that of FIG. 2 in that a dark area covering two or three adjacent ones of the photodiode areas in scanned array 81 is to be interpreted as a half-bar while a darkened area which covers at least four but no more than seven adjacent ones of the photodiodes of the array 81 is interpreted as a full bar. A darkened area which covers 8 or more of the photodiodes of the array 81 is to be interpreted as a do not read condition and no output is produced.

When the photodiodes of the array 81 have light areas projected thereon the corresponding data stored in the shift register 84 will indicate light areas in those positions and the output signals therefrom will be low. When a dark area is projected onto the photodiodes in the array 81, the outputs of the associated shift register storage cells is high. The outputs of each one of the NAND gates 85 is normally high. Whenever there is a high indication on one of the leads of one of the NAND gates 85 and a load latches pulse is concurrently received from the clock and timing circuit 82, the output of the particular NAND gate 85 sets its associated latch 86. Latches 86 which are set remain in that condition until a reset pulse is received from the clock and timing circuit 82. Several successive scans are shifted from the scanned array 81 into the shift register 84 and clocked through NAND gates 85 into the latches 86 before the latches are reset. Thus, bar code arrays which are skewed with respect to the photodiode array 81 may be read.

The outputs of the NAND gates 87 are normally high. Whenever four of the inputs of one of the gates 87 goes high, due to the fact that its associated four adjacent latches 86 have been set, by four adjacent dark photodiodes, the output of the particular NAND gate 87 goes low. The output of the NOR gate 91 is normally low so that whenever one of its inputs from one of the gates 87 becomes low, the output of the NOR gate 91 goes high.

Whenever two adjacent ones of the latches 86 is set, the associated NAND gates of the group 88 then produces a low output which in turn produces a high output at NOR gate 91.

The outputs of the EXCLUSIVE OR gates 97 and 98 are low so long as the two inputs are identical. Whenever the output of NOR gate 92 goes high while the output of NOR gate 91 remains low, the output of EXCLUSIVE OR gate 98 goes high and is coupled to one of the inputs of the half-bar output NAND gate 97. If, simultaneously, a read enable pulse is applied to line 102 by the clock and timing circuit 82, the half-bar output NAND gate 100 is energized to produce a high output signal indicative of a half-bar having been read.

When the output of the NOR gate 91 goes high, while the other input from the long bar inhibit OR gate 96 remains low, the EXCLUSIVE OR gate 97 produces an output which in turn is coupled to the input of the full bar output NAND gate 99. If, simultaneously, a read enable pulse is provided from the clock and timing circuit 82 over the line 102, the full bar output NAND gate 99 is energized to produce a high output signal indicative of a full bar having been read.

If more than seven photodiodes are covered by a dark area simultaneously so as to produce an output from more than four adjacent ones of the NAND gates 87, one of the long bar inhibit NAND gates 93–95 also produces a high output. That is, a signal from both gates 87*a* and 87*e* energizes the first long bar inhibit NAND gate 93, a signal from both gates 87*c* and 87*g* energizes the second long bar inhibit NAND gate 94 and a signal from gates 87*e* and 87*k* energize the third inhibit gate 95. An output from one of the three NAND gates 93, 94 and 95 and is coupled through OR gate 96 and inhibits the operation of the EXCLUSIVE OR gate 97 so that no output is produced. This condition is indicative of a dark area which extended over more than seven adjacent photocell areas and hence is interpreted as a do not read condition, such as a paper smudge or document edge.

It can be seen from the bar/half-bar reader circuit configuration of FIGS. 2 and 3 that both a fixed photocell array and a scanned array can be used with digital logic to provide bar/half-bar reading capabilities which function accurately even though the bars are skewed with respect to the photocell array. The embodiment of FIG. 3, employing latches 86, has been used successfully to read bars skewed up to 7° from nominal.

Greater skew handling capability may be provided by using several parallel rows of sensors to form a matrix array.

Having described the invention in connection with certain specific embodiments thereof, it is to be understood that further modifications may now suggest themselves to those skilled in the art and it is intended to cover such modifications as fall within the scope of the appended claims.

What is claimed is:

1. A bar code reader for producing output signals indicative of a pattern of full bars and half-bars disposed upon a document transported through said reader, siad bar code reader, comprising:

a columnar array of at least three separate photosensitive elements;

means for projecting an image of the bar code pattern to be read onto said columnar array;

means operatively associated with said photosensitive elements in said array and responsive to a signal from a first preselected number of said photosensitive elements for generating a half-bar output signal and responsive to a signal from a second preselected number of adjacent photosensitive elements for generating a full bar output signal, said second number being greater than said first number.

2. A bar code reader as defined in claim 1 wherein the length of the said columnar array is substantially longer than the height of the image of a full bar projected from said pattern, so that said bar code reader is operable to read patterns on a plurality of documents wherein the position of said patterns on said documents varies from document to document.

3. A bar code reader comprising:

a columnar array of at least three separate photosensitive elements;

means for amplifying the signals from said photosensitive elements;

means for comparing said amplified signals to a preselected threshhold value and producing a first intermediate signal in response to said amplified value being less than said threshhold value and producing a second intermediate signal in response to said amplified value being greater than said threshhold value;

means operatively associated with said comparing means and responsive to a first intermediate signal from at least a first preselected number of adjacent photosensitive elements for producing a half-bar output signal; and means operatively associated with said comparing means and responsive to a first intermediate signal from at least a second preselected number, greater than said first number of adjacent photosensitive elements for producing a full bar output signal and for inhibiting the production of a half-bar output signal.

4. A bar code reader as set forth in claim 3, which also includes:

means responsive to a first intermediate signal from at least a third preselected number, greater than said second number, of adjacent photosensitive elements for inhibiting the production of said full bar output signal.

5. A bar code reader as set forth in claim 3 wherein said columnar array of photosensitive elents includes a self-scanned photocell array and wherein said reader also includes:

a serial shift register connected to the output of said scanned array;

and means for clocking signals from said scanned array through said amplifying and comparing means into said serial shift register.

6. A reader for producing output signals indicative of a pattern of bar codes disposed upon a document transported therethrough, said reader comprising:

a columnar array of at least three separate photosensitive elements;

comparator means associated with each of said elements for amplifying signals from said element, comparing the amplified signals to a preselected threshold value and generating an intermediate signal in response to the amplified value being less than the threshold value;

first gating means connected to the output of each of said comparator means and responsive to an intermediate signal from at least a first preselected number of adjacent ones of said comparator means for producing a signal;

second gating means connected to the output of each of said comparator means and responsive to an intermediate signal from at least a second preselected number, greater than said first number, of adjacent ones of said comparator means for producing a signal;

delay means fesponsive to a signal from said second gating means for producing a character present signal for a preselected time interval;

output gating means connected to the outputs of said first and second gating means and said delay means and responsive to the production of a signal by said first gating means and a character present signal for generating a half-bar output signal and responsive to the production of a signal by said second gating means and a character present signal for generating a full bar output signal and inhibiting the generation of a half-bar output signal.

7. A bar code reader for producing output signals indicative of a pattern of bar codes disposed upon a document transported therethrough, said reader comprising:

a columnar array of photosensitive elements;

comparator means associated with each of said elements for amplifying signals from said element, comparing the amplified signals to a preselected threshold value and generating an intermediate signal in response to the amplified value being less than the threshold value;

first gating means connected to the output of each of said comparator means and responsive to an intermediate signal from at least a first preselected number of adjacent ones of said comparator means for producing a signal;

second gating means connected to the output of each of said comparator means and responsive to an intermediate signal from at least a second preslected number, greater than said first number, of adjacent ones of said comparator means for producing a signal;

delay means responsive to a signal from said second gating means for producing a character present signal for a preselected time interval;

output gating means connected to the outputs of said first and second gating means and said delay means and responsive to the production of a signal by said first gating means and a character present signal for generating a half-bar output signal and responsive to the production of a signal by said second gating means and a character present signal for generating a full bar output signal and inhibiting the generation of a half-bar output signal;

third gating means responsive to an intermediate signal from at least a third preselected number, greater than said second number, adjacent ones of said comparator means for producing long bar inhibit signal; and means connected to said output gating means and responsive to the production of a long bar inhibit signal for inhibiting the generation of a full bar output signal.

8. A bar code reader as set forth in claim 7 wherein said columnar array of photosensitive elements includes a plurality of adjacent phototransistors.

9. A bar code reader as set forth in claim 7 wherein said columnar array comprises light photosensitive elements;

said first preselected number is two;

said second preselected number is four; and said third preselected number is eight.

10. A bar code reader for producing output signals indicative of a pattern of bar codes disposed upon a document transported therethrough, said reader comprising:

a self-scanned array of photosensitive elements;

comparator means connected to the output of said array for amplifying signals from said photosensitive elements, comparing the amplified signals to a preselected threshold value, generating a first intermediate signal in response to the amplified value being less than the threshold value, and generating a second intermediate signal in response to the amplified value being greater than the threshhold value;

shift register storage means including one storage element for each photosensitive element in said array;

control means for periodically and sequentially scanning the elements of said array, directing the train of signals through said comparator means, and loading the train of first and second intermediate signals into said shift register storage means;

first gating means responsive to the storage of a first intermediate signal in at least a first preselected number of adjacent storage elements, in said shift register storage means for producing a signal;

second gating means responsive to a first intermediate signal in at least a second preselected number, greater than said first number, of adjacent storage elements in said shift register storage means for producing a singal;

output gating means connected to the outputs of said first and second gating means and responsive to the production of a signal by said first gating means for generating a half-bar output signal and responsive to the production of a signal by said second gating means for generating a full bar output signal and inhibiting the generation of a half-bar output signal.

11. A bar code reader as set forth in claim 10 which also includes:

loading gate means comparing a gate connected to each storage element in said shift register storage means;

latch means comprising a resetable latch connected to the output of each of said loading gates; and wherein said control means periodically energizes all of the gates of said loading gate means to set each latch associated with a storage element in said shift register which element stores a first intermediate signal, and wherein said control means resets all of said latches after a preselected time interval.

12. A bar code reader as set forth in claim 10 which also includes:

third gating means responsive to a first intermediate signal in at least a third preselected number, greater than second number, of adjacent storage elements in said shift register storage means for producing long bar inhibit; and means connected to said output gating means and responsive to the production of a long bar inhibit signal for inhibiting the generation of a full bar output signal.

13. A method for reading bar codes comprising:

projecting an image of bar codes onto a columnar array of at least three separate photosensitive elements;

amplifying the signals from said photosensitive elements;

comparing said amplified signals to a preselected threshhold value and producing a first intermediate signal in response to said amplified value being less than said threshhold value and producing a second intermediate signal in response to said amplified value being greater than said threshhold value;

generating a half-bar output signal in response to a first intermediate signal from at least a first preselected number of adjacent photosensitive elements; and generating a full bar output signal and inhibiting the generation of a half-bar output signal in response to a first intermediate signal from at least a second preselected number, greater than said first number, of adjacent photosensitive elements.

14. A method as set forth in claim 13, which also includes the step of:

inhibiting the generation of said full bar output signal in response to a first intermediate signal from at least a third preselected number, greater than said second number, of adjacent photosensitive elements.

15. A method for producing output signals indicative of a pattern of bar codes disposed upon a document transported therethrough, said method comprising:

projecting an image of said bar code pattern onto a columnar array of at least three separate photosensitive elements;

amplifying the signals from each of the elements in said array;

comparing the amplified signals to a preselected threshhold value;

generating an intermediate signal in response to the amplified value being less than the threshhold value;

generating a first signal in response to an intermediate signal associated with at least a first preselected number of adjacent ones of said elements;

generating a second signal in response to an intermediate signal associated with at least a second preselected number, greater than said first number, of adjacent ones of said elements;

generating a character present signal for a preselected time interval in response to said second signal;

generating a half-bar output signal in response to said first signal and said character present signal; and generating a full bar output signal and inhibiting the generation of a half-bar output signal in response to said second signal and said character presence signal.

* * * * *